United States Patent
Du et al.

(10) Patent No.: US 11,683,799 B2
(45) Date of Patent: Jun. 20, 2023

(54) COMMUNICATION SYSTEM

(71) Applicant: Nokia Solutions and Networks Oy, Espoo (FI)

(72) Inventors: Zhou Du, Espoo (FI); Kimmo Aronkytö, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 17/159,921

(22) Filed: Jan. 27, 2021

(65) Prior Publication Data

US 2021/0243746 A1 Aug. 5, 2021

(30) Foreign Application Priority Data

Feb. 4, 2020 (EP) ..................................... 20155394

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| | | | |
|---|---|---|---|
| 5,634,191 A | 5/1997 | Beasley | |
| 7,844,216 B2 | 11/2010 | Cleveland et al. | |
| 8,064,822 B2 | 11/2011 | Fang et al. | |
| 9,231,689 B2 | 1/2016 | Kim et al. | |
| 10,153,758 B2 | 12/2018 | Shen et al. | |
| 2005/0118949 A1 | 6/2005 | Allen et al. | |
| 2005/0254442 A1 | 11/2005 | Proctor et al. | |
| 2009/0207776 A1 | 8/2009 | Baik et al. | |
| 2015/0200764 A1* | 7/2015 | Lin | H04W 52/0212 370/278 |
| 2017/0005776 A1* | 1/2017 | Kim | H04B 1/525 |
| 2018/0069596 A1 | 3/2018 | Schmid et al. | |
| 2020/0163101 A1* | 5/2020 | Caretti | H04W 72/541 |

FOREIGN PATENT DOCUMENTS

| | | |
|---|---|---|
| CN | 1985449 A | 6/2007 |
| CN | 101438509 A | 5/2009 |
| CN | 103828261 A | 5/2014 |
| CN | 105493416 A | 4/2016 |

OTHER PUBLICATIONS

Office action received for corresponding Chinese Patent Application No. 202110152051.6, dated Nov. 1, 2022, 4 pages of office action and no page of translation available.

(Continued)

*Primary Examiner* — Nguyen H Ngo
(74) *Attorney, Agent, or Firm* — Nokia Technologies Oy

(57) ABSTRACT

An apparatus, method and computer program is described comprising: receiving an amplified uplink signal from a relay circuit, wherein the uplink signal is amplified by the relay circuit; receiving a downlink signal; processing the downlink signal by cancelling leakage uplink signals within the received downlink signal to generate a processed downlink signal; and generating a timing signal output based, at least in part, on the processed downlink signal.

20 Claims, 14 Drawing Sheets

(56) References Cited

OTHER PUBLICATIONS

Seo et al., "Low-Cost High-Performance TDD Synchronizer for WiBro RF Repeater", ETRI Journal, vol. 32, No. 4, Aug. 2010, pp. 503-511.
Extended European Search Report received for corresponding European Patent Application No. 20155394.8, dated Jul. 31, 2020, 9 pages.
Office action received for corresponding Chinese Patent Application No. 202110152051.6, dated Mar. 2, 2022, 8 pages of office action and 5 pages of translation available.

* cited by examiner

COMMUNICATION SYSTEM

FIELD

The present specification relates to communication systems.

BACKGROUND

Relays may be used for amplifying uplink and/or downlink signals in communication systems. However, there remains a need for further developments in this field.

SUMMARY

In a first aspect, this specification describes an apparatus (e.g. a control circuit) comprising means for performing: receiving an amplified uplink signal (e.g. an amplified RF uplink signal) from a relay circuit, wherein the uplink signal is amplified by the relay circuit; receiving a downlink signal (e.g. an RF downlink signal); processing the downlink signal by cancelling leakage uplink signals (e.g. by subtraction, for example using a differential amplifier) within the received downlink signal to generate a processed downlink signal; and generating a timing signal output based, at least in part, on the processed downlink signal. The timing signal may be a TDD synchronization signal. The apparatus may comprise said relay circuit.

In some example embodiments, the means are further configured to perform: providing the timing signal to the relay circuit. The timing signal may be provided to synchronise transmit and receive switching of the relay circuit.

In some example embodiments, the means are further configured to perform: coupling (e.g. using a first coupler) the downlink signal to the means for performing processing of said downlink signal; and coupling (e.g. using a second coupler) the amplified uplink signal to the means for performing processing of said downlink signal. In some example embodiments, a single coupler is used for coupling both the downlink signal and the amplified uplink signal to the relevant processing means.

The downlink signal may be received from a communication node of a mobile communication system (e.g. a base station). The uplink signal may be received from a user device or some other device.

In some example embodiments, the means are further configured to perform: generating an envelope of said downlink signal, wherein said downlink signal includes leakage uplink signals; and generating an envelope of said uplink signal. The means may be further configured to perform: processing the envelope of said downlink signal and the envelope of said uplink signal in order to cancel the leakage uplink signals within said received downlink signal.

In some example embodiments, the means are further to perform: comparing (e.g. using a comparator) the downlink signal to a threshold value to generate said timing signal.

In some example embodiments, the means are further to perform: tuning a duty cycle of the timing signal to compensate for processing delays, for example by adjusting timing of rising and/or falling edges of a chain of timing signals. Duty cycle tuning may be implemented using a flip-flop circuit, as discussed in detail below.

The relay circuit may be configured to amplify signals at an intermediate frequency.

Some example embodiments further comprise: a first antenna in two-way communication with a first node of a mobile communication system, wherein said first antenna is configured to receive said downlink signal and to send the amplified uplink signal; and a second antenna in two-way communication with a second node of a mobile communication system, wherein said second antenna is configured to receive said uplink signal and to send the amplified downlink signal.

The said means may comprise: at least one processor; and at least one memory including computer program code, the at least one memory and the computer program configured, with the at least one processor, to cause the performance of the apparatus.

In a second aspect, this specification describes a method comprising: receiving (e.g. at a control circuit) an amplified uplink signal (e.g. an amplified RF uplink signal) from a relay circuit, wherein the uplink signal is amplified by the relay circuit; receiving a downlink signal (e.g. an RF downlink signal); processing the downlink signal by cancelling leakage uplink signals (e.g. by subtraction, for example using a differential amplifier) within the received downlink signal to generate a processed downlink signal; and generating a timing signal output based, at least in part, on the processed downlink signal. The timing signal may be a TDD synchronization signal.

The method may further comprise: providing the timing signal to the relay circuit. The timing signal may be provided to synchronise transmit and receive switching of the relay circuit.

The method may further comprise: coupling (e.g. using a first coupler) the downlink signal to a means for performing processing of said downlink signal; and coupling (e.g. using a second coupler) the amplified uplink signal to a means for performing processing of said downlink signal.

The downlink signal may be received from a communication node of a mobile communication system (e.g. a base station). The uplink signal may be received from a user device or some other device.

The method may further comprise: generating an envelope of said downlink signal, wherein said downlink signal includes leakage uplink signals; and generating an envelope of said uplink signal. The method may further comprise: processing the envelope of said downlink signal and the envelope of said uplink signal in order to cancel the leakage uplink signals within said received downlink signal.

The method may further comprise: comparing (e.g. using a comparator) the downlink signal to a threshold value to generate said timing signal.

The method may further comprise: tuning a duty cycle of the timing signal to compensate for processing delays, for example by adjusting timing of rising and/or falling edges of a chain of timing signals.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receiving an amplified uplink signal (e.g. an amplified RF uplink signal) from a relay circuit, wherein the uplink signal is amplified by the relay circuit; receiving a downlink signal (e.g. an RF downlink signal); processing the downlink signal by cancelling leakage uplink signals (e.g. by subtraction, for example using a differential amplifier) within the received downlink signal to generate a processed downlink signal; and generating a timing signal output based, at least in part, on the processed downlink signal.

In a sixth aspect, this specification describes a computer-readable medium (such as a non-transitory computer-readable medium) comprising program instructions stored thereon for performing at least the following: receiving an amplified uplink signal (e.g. an amplified RF uplink signal) from a relay circuit, wherein the uplink signal is amplified by the relay circuit; receiving a downlink signal (e.g. an RF downlink signal); processing the downlink signal by cancelling leakage uplink signals (e.g. by subtraction, for example using a differential amplifier) within the received downlink signal to generate a processed downlink signal; and generating a timing signal output based, at least in part, on the processed downlink signal.

In a seventh aspect, this specification describes an apparatus comprising: at least one processor; and at least one memory including computer program code which, when executed by the at least one processor, causes the apparatus to: receive an amplified uplink signal (e.g. an amplified RF uplink signal) from a relay circuit, wherein the uplink signal is amplified by the relay circuit; receive a downlink signal (e.g. an RF downlink signal); process the downlink signal by cancelling leakage uplink signals (e.g. by subtraction, for example using a differential amplifier) within the received downlink signal to generate a processed downlink signal; and generate a timing signal output based, at least in part, on the processed downlink signal.

In an eighth aspect, this specification describes an apparatus comprising: means (such as a first input of a control module) for receiving an amplified uplink signal (e.g. an amplified RF uplink signal) from a relay circuit, wherein the uplink signal is amplified by the relay circuit; means (such as a second input of the control module) for receiving a downlink signal (e.g. an RF downlink signal); means (such as part of the control module, for example incorporating a different amplifier, switching arrangement or some other signal cancellation means) for processing the downlink signal by cancelling leakage uplink signals within the received downlink signal to generate a processed downlink signal; and means (such as a comparator) for generating a timing signal output based, at least in part, on the processed downlink signal.

BRIEF DESCRIPTION OF THE DRAWINGS

Example embodiments will now be described, by way of example only, with reference to the following schematic drawings, in which.

DETAILED DESCRIPTION

Figure 1:
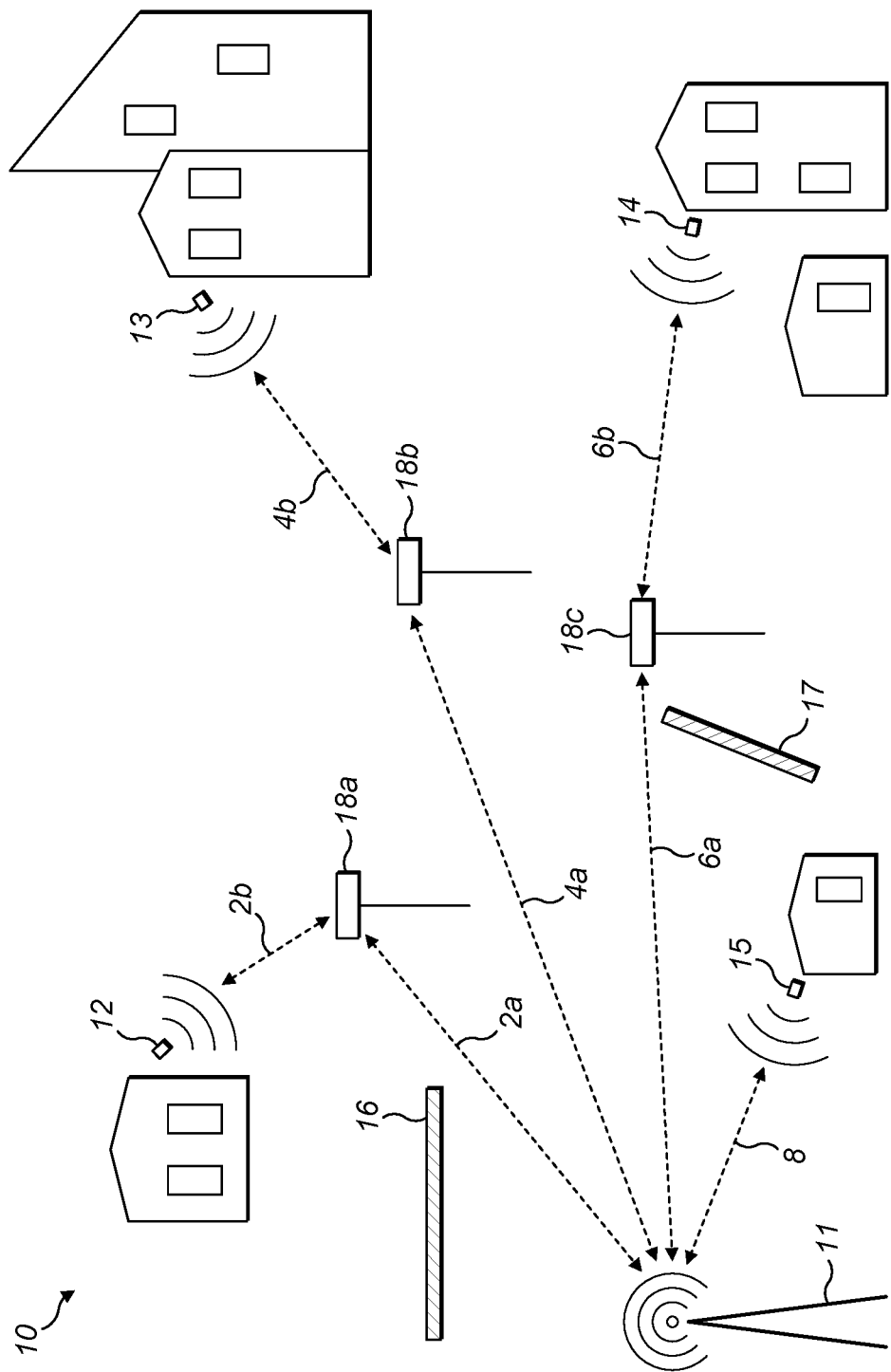
FIGS. 1 and 2 are block diagrams systems in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

The use of the millimeter wave (mmW) frequency band is a candidate technology for use in fifth generation (5G) communication systems and beyond. Compared with lower frequency bands, mmW offers the potential for high bandwidth communications and, due to its short wavelength, a large number of antenna elements can be integrated into a small front-end, in which beam steering and beam forming techniques can be employed to provide high-gain, directional beams, with reduced interference.

Millimeter wave technologies are well suited to mobile broadband communications and fixed access communications. In a fixed access network, potential end users include customer premise equipment (CPE) at home and small to medium sized entities (SMEs), for example in suburban or rural areas, that demand high-speed connectivity. Conventionally, for last-mile connectivity, operators use fiber-to-the-home (FTTH) and other cabled solutions, in which connections are provided by copper, optical fiber or hybrid solutions which may involve heavy construction work. Such construction significantly increases the rollout cost and operating expense (OPEX) and tends to lower the speed of rollout of such services. To lower the OPEX while maintaining significant coverage and higher data rates, mmW wireless link is a promising alternative. By way of example, mmW fixed wireless access (FWA) has emerged as a promising use case for early 5G network rollout in North America.

The communication range of mmW may be shorter than many other wireless technologies due to the short wavelength and increased attenuation experienced during propagation. Also, mmW wireless links may have insufficient power to penetrate many obstructions, such that propagation is easily blocked. Therefore, line-of-sight (LoS) conditions may be preferred for many mmW links. However, in many real situations, both LoS and Non-LoS typically exist, and the blockages may cause significant differences in these two scenarios.

FIG. 1 is a block diagram of a system, indicated generally by the reference numeral 10, in accordance with an example embodiment. The system 10 comprises a communication node 11 (such as a base station) that is in wireless two-way communication with first to fourth access points 12 to 15.

A first barrier 16 is located between the communication node 11 and the first access point 12. A second barrier 17 is located between the communication node 11 and the third access point 14. The barriers 16 and 17 prevent line-of-sight (LOS) communication between the communication node 11 and the respective access points.

The system 10 comprises a first relay 18a, a second relay 18b and a third relay 18c. The relays 18a to 18c boost signals being transmitted between the communication node 11 and the relevant access point.

For example, the first relay 18a enables communications between the communication node 11 and the first access point 12 and comprises a first link 2a between the communication node 11 and the first relay and a second link 2b between the first relay and the first access point 12 (thereby providing a non-line of sight (NLOS) connection between the communication node 11 and the first access point 12). The second relay 18b enables communications between the communication node 11 and the second access point 13 and comprises a first link 4a between the communication node 11 and the second relay and a second link 4b between the second relay and the second access point 13 (addressing the problem of the long LOS connection between communication node and the second access point, which may be a problem due to attenuation of the mmW signal). The third relay 18c enables communications between the communication node 11 and the third access point 14 and includes a first link 6a between the communication node 11 and the third relay and a second link 6b between the third relay and the third access point 14 (thereby providing a non-line of sight (NLOS) connection between the communication node 11 and the third access point 14). An adequate LOS connection 8 exists between the communication node 11 and the fourth access point 15 and so no relay is required for that access point.

Although the system 10 includes communication links having either no relay or a single relays, this is not essential to all example embodiments. For example, multiple, cascaded relays may be provided between a communication node and access point. For example, a plurality of cascaded relays could be provided between the communication node 11 and the access point 13.

Relays, such as the relays 18a to 18c described above, can be used to increase coverage, throughput and transmission reliability of a communication system. For millimeter wave communications, such relays may require precise and expensive hardware components.

Figure 2:
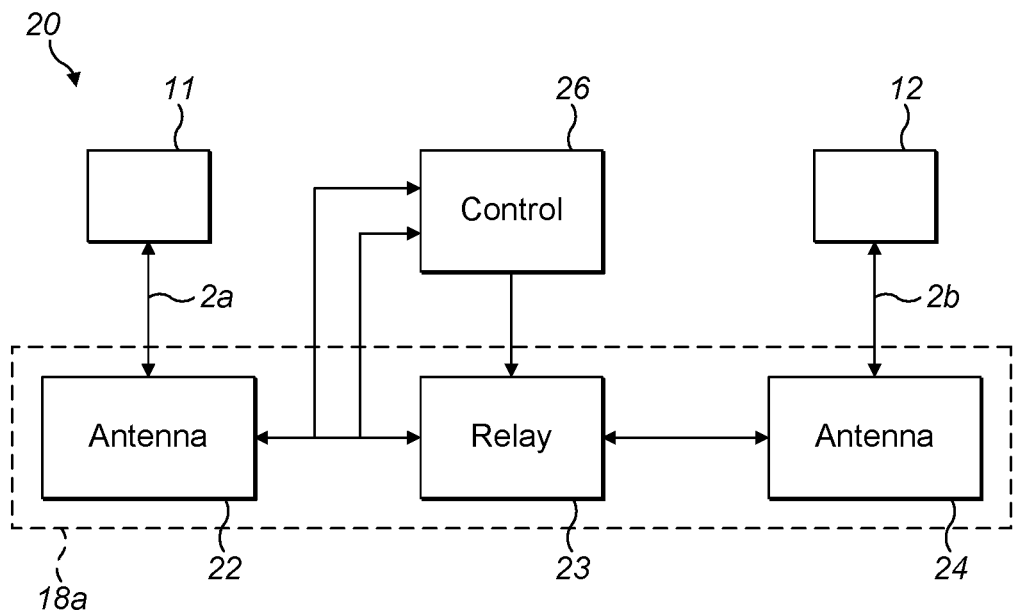

FIG. 2 is a block diagram of a system, indicated generally by the reference numeral 20, in accordance with an example embodiment. The system 20 comprises the communication node 11, the first relay 18a and the first access point 12 described above. The first relay 18a comprises a first antenna 22, a relay module 23, and a second antenna 24. The system 20 further comprises a control module 26 for providing synchronisation signals for the relay module 23, as discussed in detail below. The relays 18b and 18c may have similar configurations. (It should be noted that although the control module 26 is shown outside the first relay 18a in the example system 20, that control module may be considered to form a part of the relay and could be physically provided either inside or outside the first relay 18a.)

The first antenna 22 is in two-way communication with the communication node 11 via the first link 2a. Similarly, the second antenna 24 is in two-way communication with the access point 12 via the second link 2b.

Downlink (DL) signals for communications from the communication node 11 to the access point 12 are provided in bursts. DL bursts are received at the first antenna 22, amplified by the relay module 23 and output by the second antenna 24. Similarly, uplink (UL) signals for communications from the access point 12 to the communication node 11 are provided in bursts. UL bursts are received at the second antenna 24, amplified by the relay module 23 and output by the first antenna 22.

Thus, the first antenna 22 is in two-way communication with the communication node 11 and is configured to receive downlink signals from the communication node 11 and to send amplified uplink signal to the communication node. Similarly, the second antenna 24 is in two-way communication with the access point 12 and is configured to receive uplink signals from the access point 12 and to send amplified downlink signals to the access point.

The control circuit 26 provides a time division duplex (TDD) synchronisation signal to the relay module 23 to synchronise the relay module with the UL and DL bursts.

Figure 3:
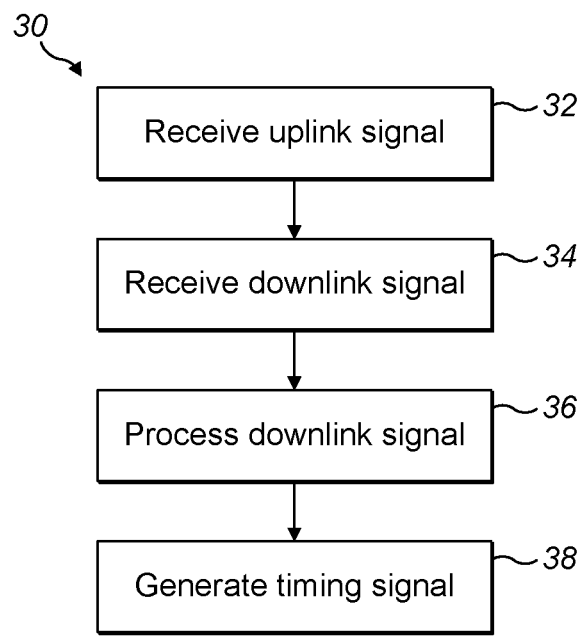
FIG. 3 is a flowchart showing an algorithm in accordance with an example embodiment.

FIG. 3 is a flowchart showing an algorithm, indicated generally by the reference numeral 30, in accordance with an example embodiment. The algorithm 30 may be implemented by the system 20.

At operation 32, an amplified uplink signal (e.g. an RF uplink signal) is received at the control circuit 26 from the relay module 23. The uplink signal is amplified by the relay module 23 (for example, as described further below, the relay module may amplify signals (including the uplink signal) at an intermediate frequency).

At operation 34, a downlink signal (e.g. an RF downlink signal) is received at the control circuit 26 from the first antenna 22. As discussed further below, as a result of the amplification provided by the relay module 23, the downlink signal as provided to the relay module 23 typically includes leakage uplink signals. (It should be noted that in many example embodiments, the operations 32 and 34 may be carried out at the same time or in a different order.)

At operation 36, the downlink signal is processed by cancelling leakage uplink signals within the received downlink signal to generate a processed downlink signal. The cancellation may be done by subtraction, as discussed in detail below.

At operation 38, a timing signal output (e.g. a TDD synchronisation signal) is generated based, at least in part, on the processed downlink signal. That timing signal may be provided to the relay module 23 such that transmit/receive switching of the relay module 23 can be synchronised.

Figure 4:
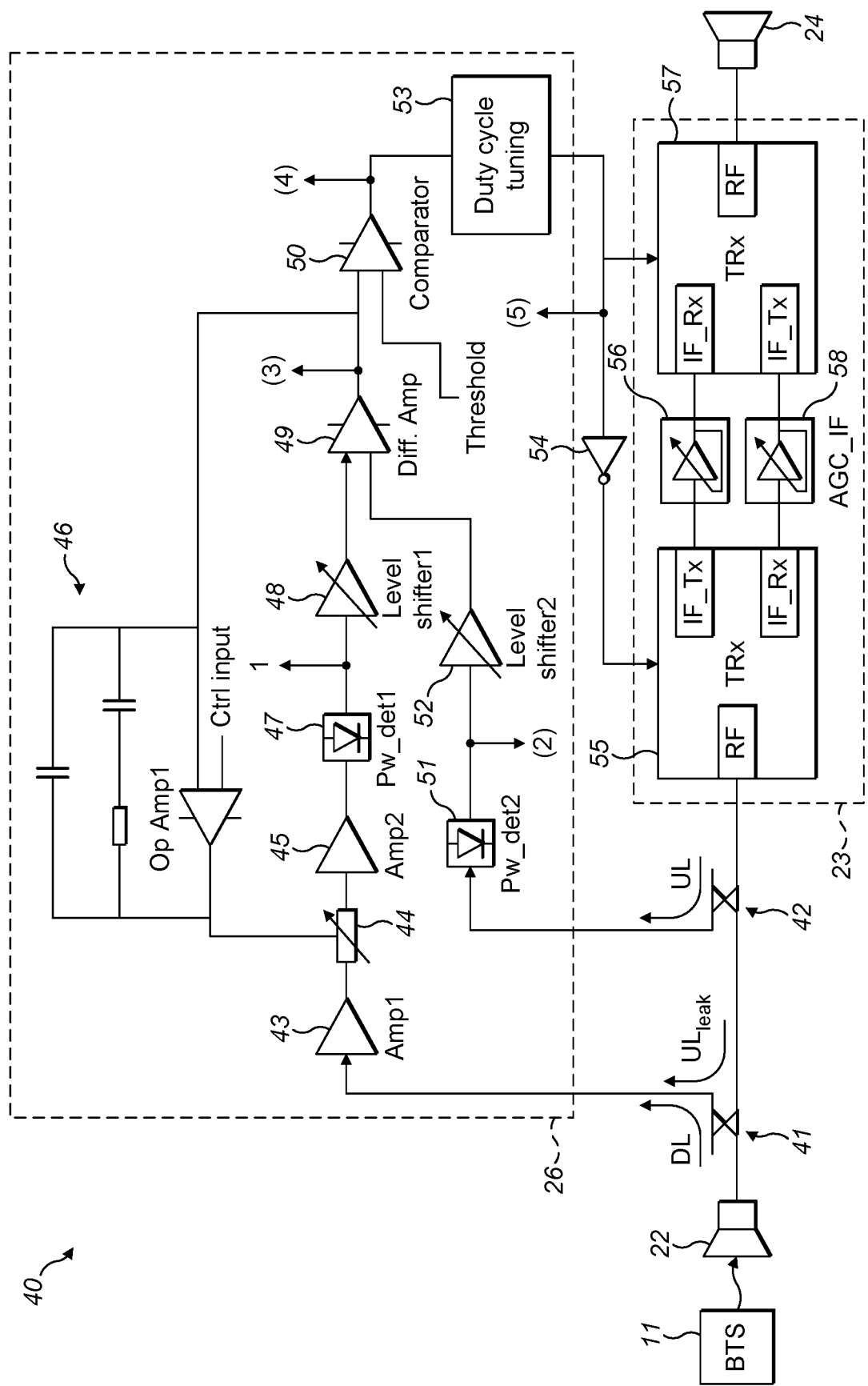
FIG. 4 is a block diagram of a system in accordance with an example embodiment.

FIG. 4 is a block diagram of a system, indicated generally by the reference numeral 40, in accordance with an example embodiment. The system 40 comprises the communication node 11, the first antenna 22, the relay module 23, the second antenna 24 and the control circuit 26 of the system 20 described above. The second antenna 24 may be in two-way communication with the access point 12 (not shown in FIG. 4).

Thus, the communication node 11 sends downlink transmissions to the first antenna 22. The control circuit 26 (which may be referred to as a TDD recovery unit) extracts a TDD synchronization signal from downlink bursts received at the first antenna 22 and feeds the synchronization signal to the relay module 23. Therefore, transmit/receive switching synchronisation of the relay module 23 is synchronized to the downlink transmission bursts, thereby providing time division duplex (TDD) control.

The system 40 comprises a first coupler 41 for coupling downlink signals as received at first antenna 22 to the control circuit 26 (e.g. to a means for performing processing of said downlink signal). Similarly, the system 40 comprises a second coupler 42 for coupling amplified uplink signals (as output by the relay module 23) to the control circuit 26 (e.g. to a means for performing processing of said downlink signal). Although the system 40 shows separate first and second couplers, this is not essential to all example embodiments. For example, a single coupler providing both coupling functions could be provided.

The system 40 comprises circuitry for processing the downlink signal comprising a first amplifier 43, a variable resistor 44, a second amplifier 45, an automatic gain control circuit 46 comprising an operational amplifier (Op Amp 1), a first power detector 47, a first level shifter 48, a differential amplifier 49 and a comparator 50. The first level shifter 48 may be provided as an amplifier (i.e. to boost the relevant signal). In some example embodiments, the amplification functionality of the first level shifter 48 may be provided by the differential amplifier 49.

The system 40 further comprises circuitry for processing the uplink signal comprising a second power detector 51, a second level shifter 52, the differential amplifier 49 and the comparator 50. Again, the second level shifter 52 may be provided as an amplifier (i.e. to boost the relevant signal) and, in some example embodiments, the amplification functionality of the second level shifter 52 may be provided by the differential amplifier 49.

A duty cycle tuning circuit 53 may be provided to correct a duty cycle of an output of the comparator 50, as discussed further below.

The relay module 23 comprises a first stand-alone transceiver 55, a first intermediate frequency amplifier 56, a second stand-alone transceiver 57 and a second intermediate frequency amplifier 58. The TDD signal recovered by the control circuit 26 (and output by the comparator 50) is applied to the transceivers in both in-phase and inverted form. Therefore, an inverter circuit 54 is provided after the duty cycle tuning circuit 53.

In use, the power of the downlink signal, as received at the antenna 22, may be small due to propagation losses. In an example implementation, the received downlink power was of the order of −40 dBm, compared with an amplified uplink power at the output of the relay circuit 23 of the order of 5 dBm. To compensate for such propagation losses, amplification is provided before the first power detector 47. The automatic gain control circuit 46 is provided to keep the suitable power level for the first power detector 47. The Op_Amp1 uses a reference voltage as a threshold.

As indicated above, the amplified uplink power is typically much larger than the received downlink power. The directivity of directional couplers that may be used to implement the first coupler 41 and the second coupler 42 may be of the order of 30 to 40 dB, which may not be sufficient to fully prevent the leakage of amplified uplink signals into the downlink signal provided to the input of the first amplifier 43.

Thus, in the use of the system 40, uplink signals tend to leak through the first coupler 41 and sum up with detected downlink signals.

The first power detector 47 detects incoming downlink bursts as received at the first antenna 22, together with any uplink leakage signals ($UL_{leak}$) Similarly, the second power detector 51 detects bursts in the amplified uplink signal output by the relay circuit 23. The first and second power detectors may, for example, be RF envelope detectors. The envelopes may be related to the RF power level in the time domain of the relevant signal. For example, envelope detectors implementing the first and second power detectors 47 and 51 may be required to detect an incoming RF burst without significant delay.

The differential amplifier 49 is configured to remove the uplink leakage signals by subtracting uplink signals from the summed downlink and leakage uplink signals, as discussed further below.

Figure 5:
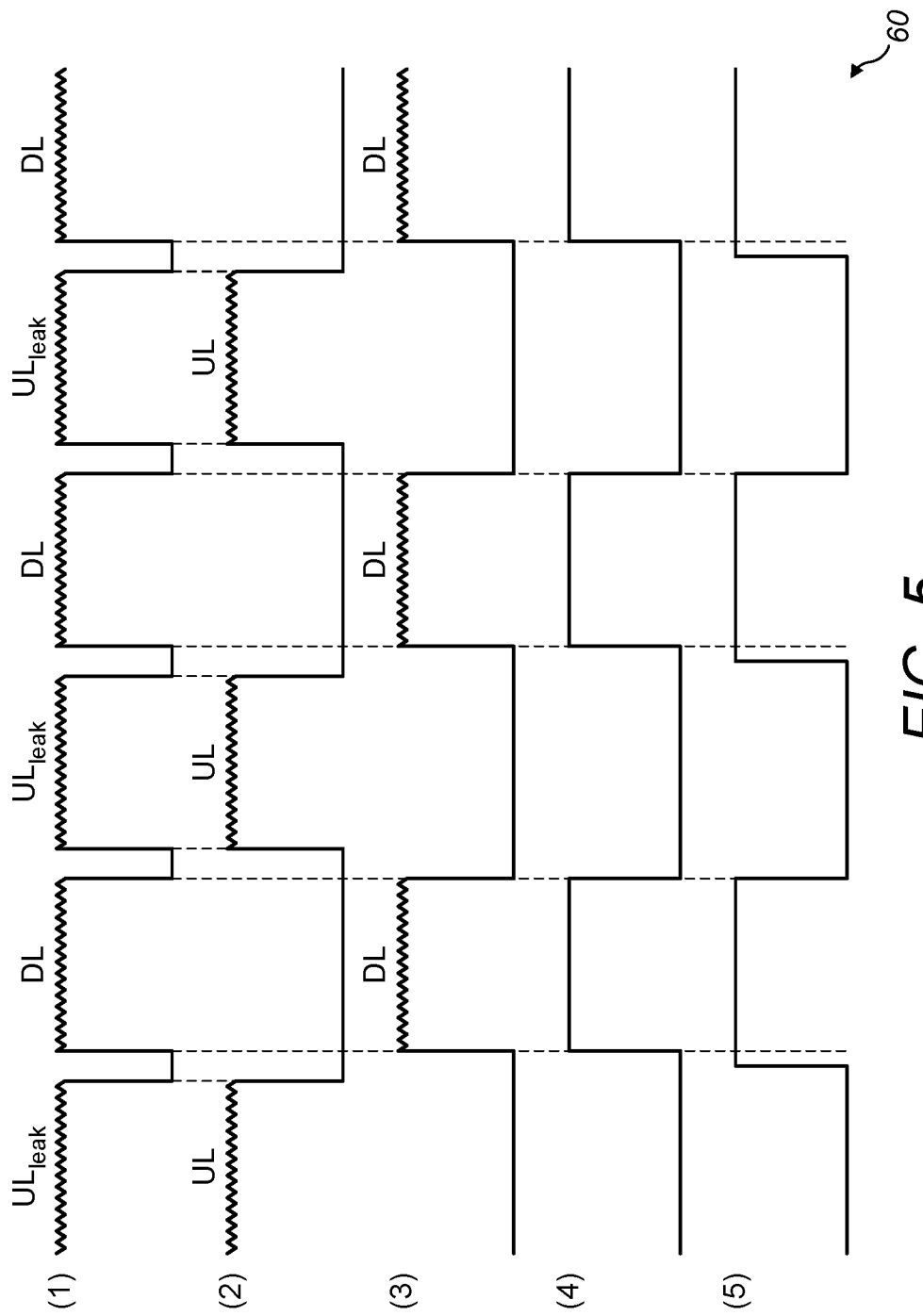
FIG. 5 is a plot showing signals in accordance with an example embodiment.

FIG. 5 is a plot, indicated generally by the reference numeral 60, showing signals in accordance with an example embodiment.

The plot 60 shows a first signal (1) that is an example output of the first power detector 47 and a second signal (2) that is an example output of the second power detector 51. As shown in the plot 60, the first signal (1) includes both the downlink signals received at the first antenna 22 and the leakage amplified uplink signals ($UL_{leak}$). As shown in the plot 60, the uplink and downlink signals are synchronised so that they do not overlap.

The differential amplifier 49 processes the envelopes of said downlink signal and the leakage uplink signals in order to cancel uplink signals within the received downlink signal (which uplink signals occur at the same time as the leakage uplink signal), thereby generating a processed downlink signal. The output of the differential amplifier 49 is the signal (3) in the plot 60. As shown in FIG. 5, the signal (3) includes only the downlink signal.

The comparator 50 compares the processed downlink signal to a threshold value to generate a timing signal (the time division duplex (TDD) synchronisation signal). The output of the comparator is the signal (4) in the plot 60. As shown in FIG. 5, the signal (4) is closer to a binary signal than the signal (3), due to the action of the comparator 50.

The TDD synchronisation signal output by the comparator 50 is recovered from the detected downlink bursts. As such, there is typically some delay between the TDD reference signal (as received at the first antenna 22) and TDD recovered signal (as output by the comparator 50). If the system does not tolerate such a delay, the duty cycle tuning circuit 53 may be deployed to shift the TDD pulse rising edge to start earlier or later or a new pulse is generated so that the new pulse gets its timing from the previous pulse. An example implementation of the duty cycle tuning circuit 53 is discussed further below.

Thus, the duty cycle tuning circuit 53 may be provided to adjust the duty cycle of the output of the comparator 50. The output of the duty cycle tuning circuit 53 is the signal (5) in the plot 60. As shown in FIG. 5, the rising edge of the signal (5) has been adjusted relative to the rising edge of the signal (4), but the falling edge of that signal is unchanged. Thus, rising edges of a chain of pulses of the signal (5) occur earlier than rising edges of the pulses of the signal (4).

Figure 6:
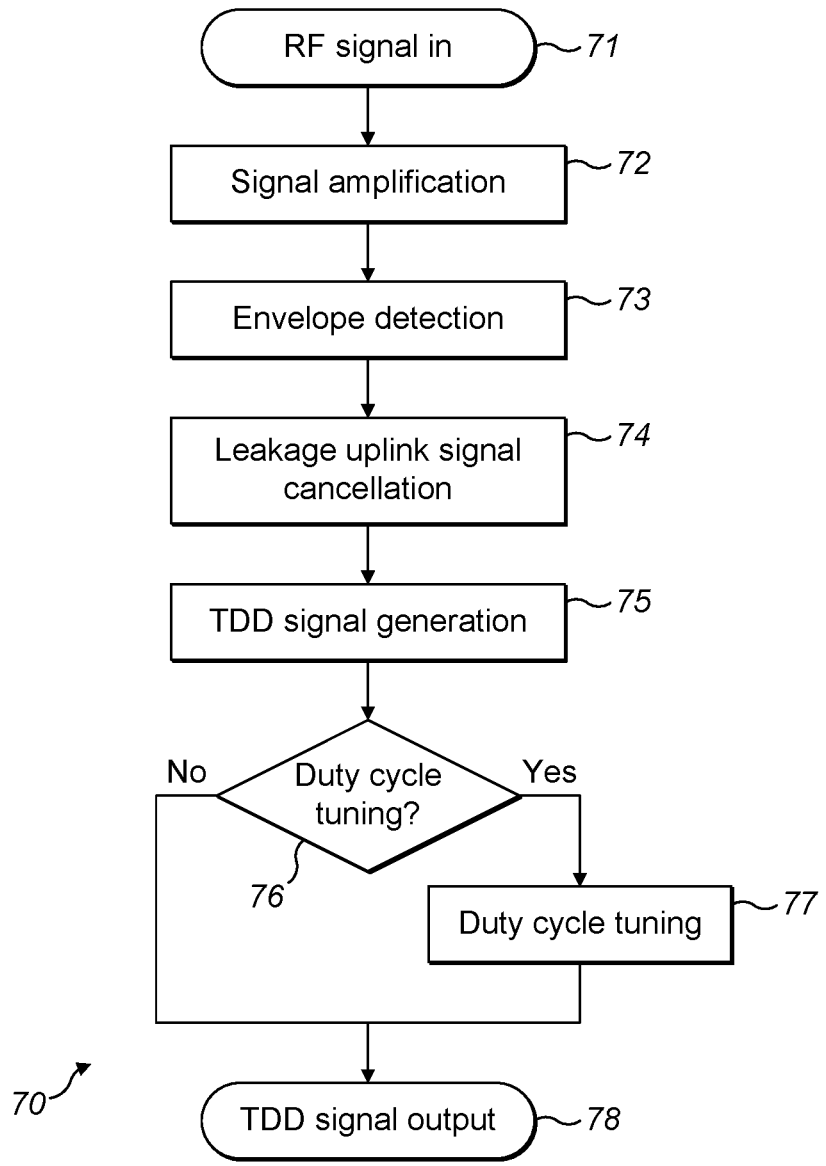
FIG. 6 is a flowchart showing an algorithm in accordance with an example embodiment.

FIG. 6 is a flowchart showing an algorithm, indicated generally by the reference numeral 70, in accordance with an example embodiment. The algorithm 70 may be implemented by the control module 26 described above.

The algorithm 70 starts at operation 71, where RF signals are received. For example, the RF signals may include the signals received at the control module 26 from the first coupler 41 and the second coupler 42 (i.e. the downlink and uplink signals described above).

At operation 72, the RF signals may be amplified, as required. In particular, the signals from the first coupler 41 (as received at the first antenna 22) may require amplification.

At operation 73, the downlink signal is processed by the power detector 47 to generate an envelope of the downlink signal and the uplink signal is processed by the power detector 51 to generate an envelope of the uplink signal.

At operation 74, the processed uplink and downlink signals (i.e. the signal envelopes) are processed using the differential amplifier 49 to cancel the leakage uplink signals within the received downlink signal. In effect, the uplink signals are subtracted from the downlink signal.

At operation 75, the downlink signal (with leakage uplink signals removed) is compared to a threshold value (e.g. using the comparator 50) to generate a timing signal (i.e. the TDD synchronisation signal).

At operation 76, if duty cycle tuning is required, then the algorithm moves to operation 77; otherwise the algorithm moves to operation 78. In some example implementations, there may not be a specific operation 76. Rather, if duty cycle tuning is provided, then the algorithm 70 may move directly from the operation 75 to the operation 77 and if duty cycle tuning is not provided, the algorithm 70 may move directly from the operation 75 to the operation 78.

At operation 77 (if provided), the duty cycle of the timing signal is tuned to compensate for processing delays. As discussed further below, tuning the duty cycle may comprise adjusting timing of rising and/or falling edges of a chain of timing signals.

At operation 78, the TDD signal (with or without duty cycle tuning) is output from the control module 26 to the relay module 23.

Figure 7:
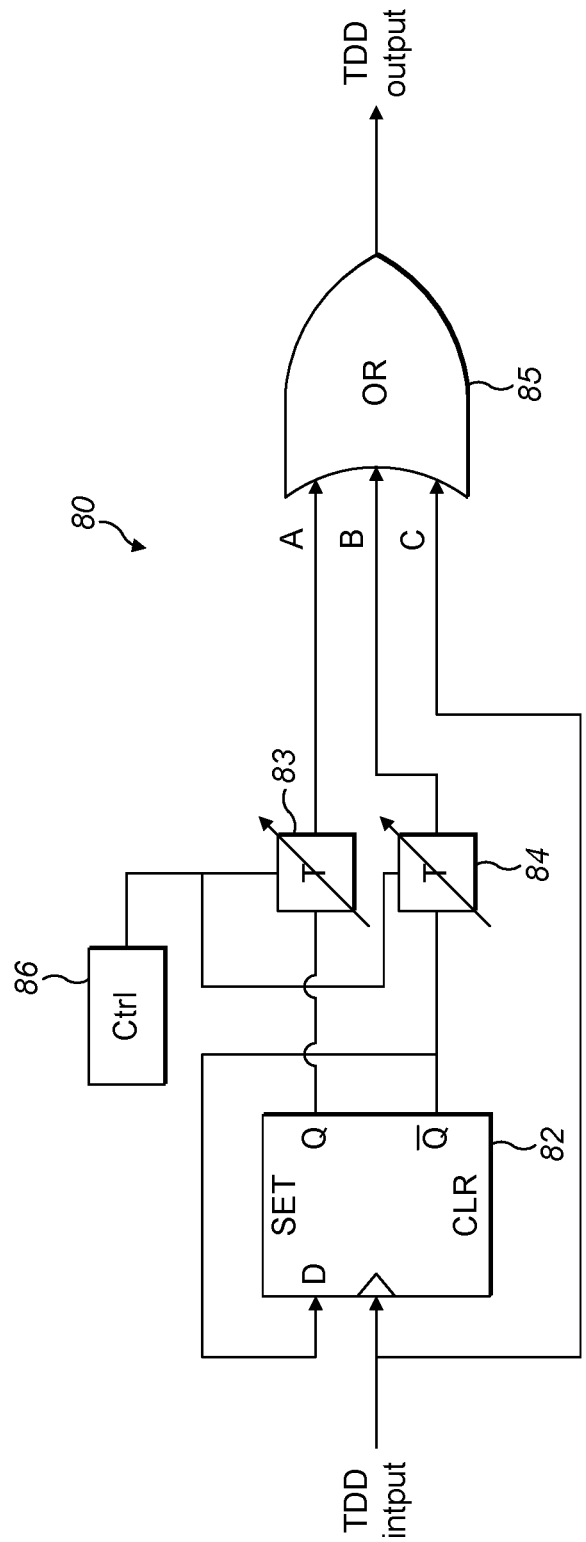
FIG. 7 is a block diagram of a circuit in accordance with an example embodiment.

FIG. 7 is a block diagram of a circuit, indicated generally by the reference numeral 80, in accordance with an example embodiment. The circuit 80 is an example implementation of the duty cycle tuning module 53 described above (as used, for example, in the operation 77 of the algorithm 70).

The circuit 80 comprises a D-type flip-flop 82, a first delay stage 83, a second delay stage 84 and an OR gate 85. The circuit 80 may further comprise a control circuit 86 providing a control input to the first and second delay stages. It should be noted that the circuit 80 is provided by way of example; alternative implementations of the duty cycle tuning module are possible.

Figure 8:
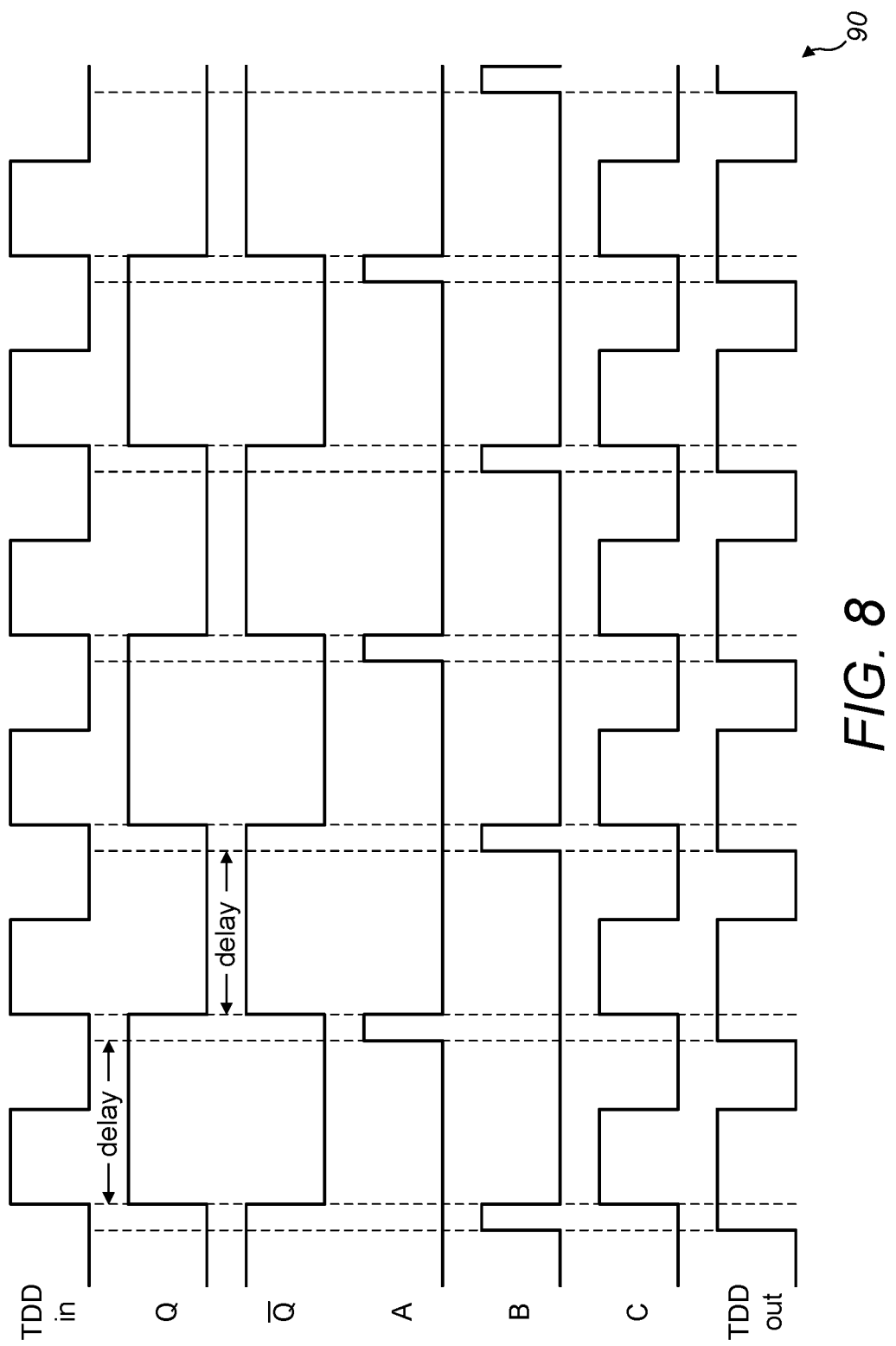
FIG. 8 is a plot showing signals in accordance with an example embodiment.

FIG. 8 is a plot, indicated generally by the reference numeral 90, showing signals in accordance with an example embodiment. The plot 80 shows various signals of the circuit 80 described above.

The circuit 80 receives an input signal TDD input (TDD In). That signal is the TDD synchronisation signal, subject to a processing delay and may, for example, be the output of the comparator 50 of the control module 26 described above.

The TDD input (TDD In) is provided as the clock input to the D-type flip-flop 82, which operates as a simple divider (dividing by two), as indicated by the Q-output and the Q̄-output of the flip-flop 82 shown in the plot 90.

The first delay stage 83 and the second delay stage 84 delay the rising edge Q-output and the Q̄-output of the flip-flop 82 respectively (but do not delay the falling edges). As shown in the plot 90, the delay is almost a full cycle of the TDD In signal. Thus, the output of the first delay stage 83 (the signal A) and the output of the second delay stage 84 (the signal B) are short pulses that start just before alternating rising edges of the TDD In signal.

The OR gate 85 generates the logical OR of the signal A, the signal B and the TDD input. That OR combination provides the TDD output (TDD Out) signal shown in FIG. 8, which is essentially the TDD input signal, but with slightly earlier rising edges. In this way, the circuit 80 can be used to tune a duty cycle of the timing signal to compensate for processing delays by making the rising edges of the timing signal occur slightly earlier, thereby adjusting timing of rising edges of a chain of timing signals. The adjustment to the timing signal can be controlled by changing the delays introduced by the delay stages 83 and 84. By way of example, the control circuit 86 may provide control inputs to the delay stages 83 and 84 for controlling said delays. The control inputs may be variable. Of course, the delays may be altered in many other ways, such that the control circuit 86 is optional.

Figure 9:
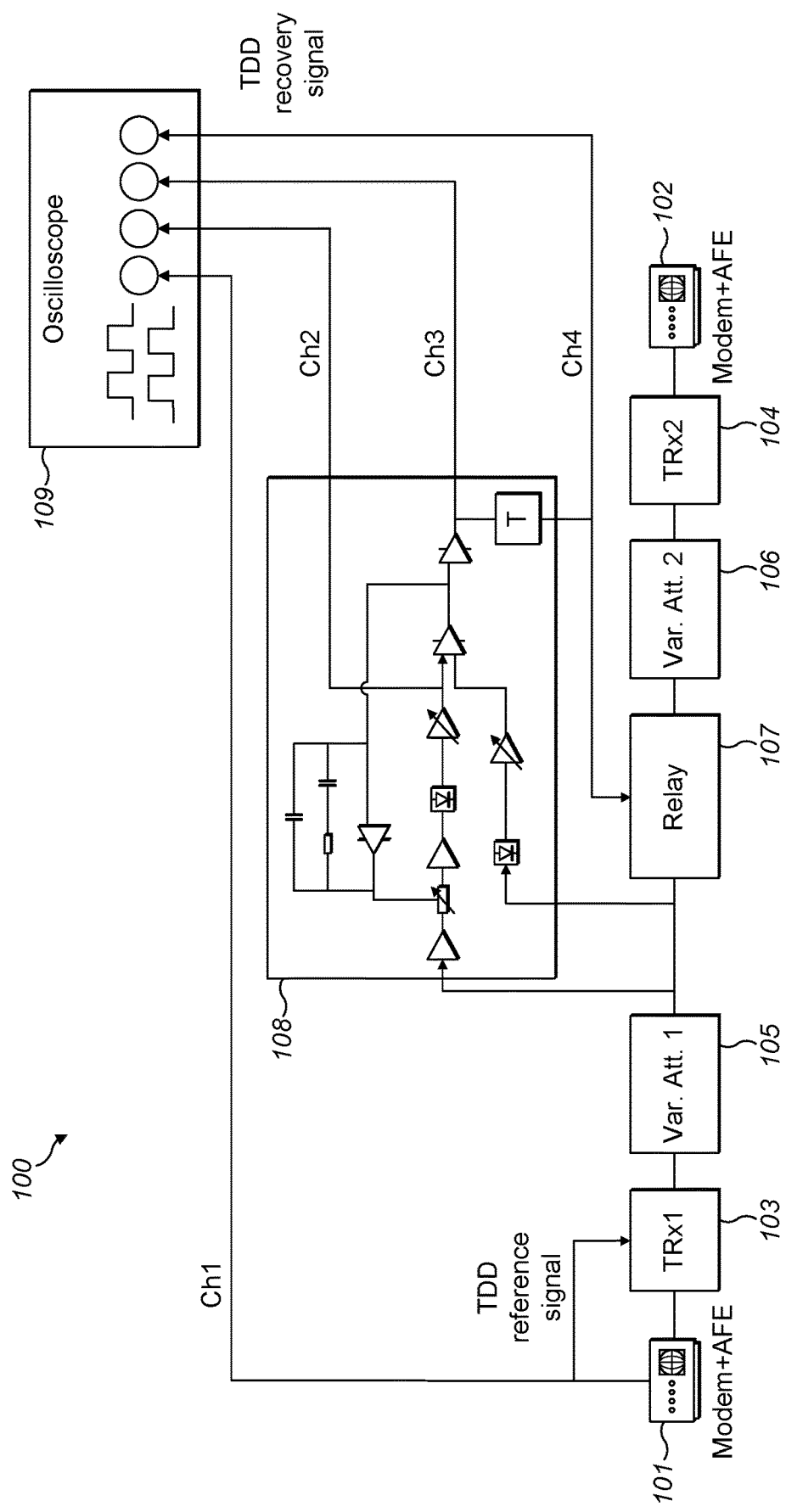
FIG. 9 is a block diagram of a system in accordance with an example embodiment.

FIG. 9 is a block diagram of a system, indicated generally by the reference numeral 100, in accordance with an example embodiment. The system 100 shows an example test setup that may be used to test the principles described herein.

The system 100 comprises a first modem 101 (e.g. 500 MHz bandwidth modem) with a first transceiver 103 for transmitting and receiving signals and a second modem 102 (e.g. 500 MHz bandwidth modem) with a second transceiver 104 for transmitting and receiving signals.

The output of the first transceiver 103 is provided to an input of a first variable attenuator 105, the output of which is provided as a first input to a relay 107. Similarly, the output of the second transceiver 104 is provided to an input of a second variable attenuator 106, the output of which is provided as a second input to the relay 107. A control circuit 108 generates a timing signal for the relay 107.

The relay 107 may be the relay 23 described above and the control circuit 108 may be the control circuit 26 described above, such that the system 100 can be used to simulate the system 40, with the first modem 101, first transceiver 103 and first variable attenuator 105 simulating the operation of the communication node 11, attenuating transmission channel and the first antenna 22 and the second modem 102, second transceiver 104 and second variable attenuator 106 simulating the operation of the access point 12, attenuation transmission channel and second antenna 24.

An oscilloscope 109 is provided to measure various signals of the system 100. Channel 1 of the oscilloscope 109 depicts the original TDD signal from the first modem 101, channel 2 depicts the envelope of the downlink signal (e.g. the output of the first power detector 47 of the control circuit 26), channel 3 depicts the recovered TDD signal (after cancellation of leakage uplink signals) and channel 4 depicts the recovered TDD signal after duty cycle tuning.

Figure 10:
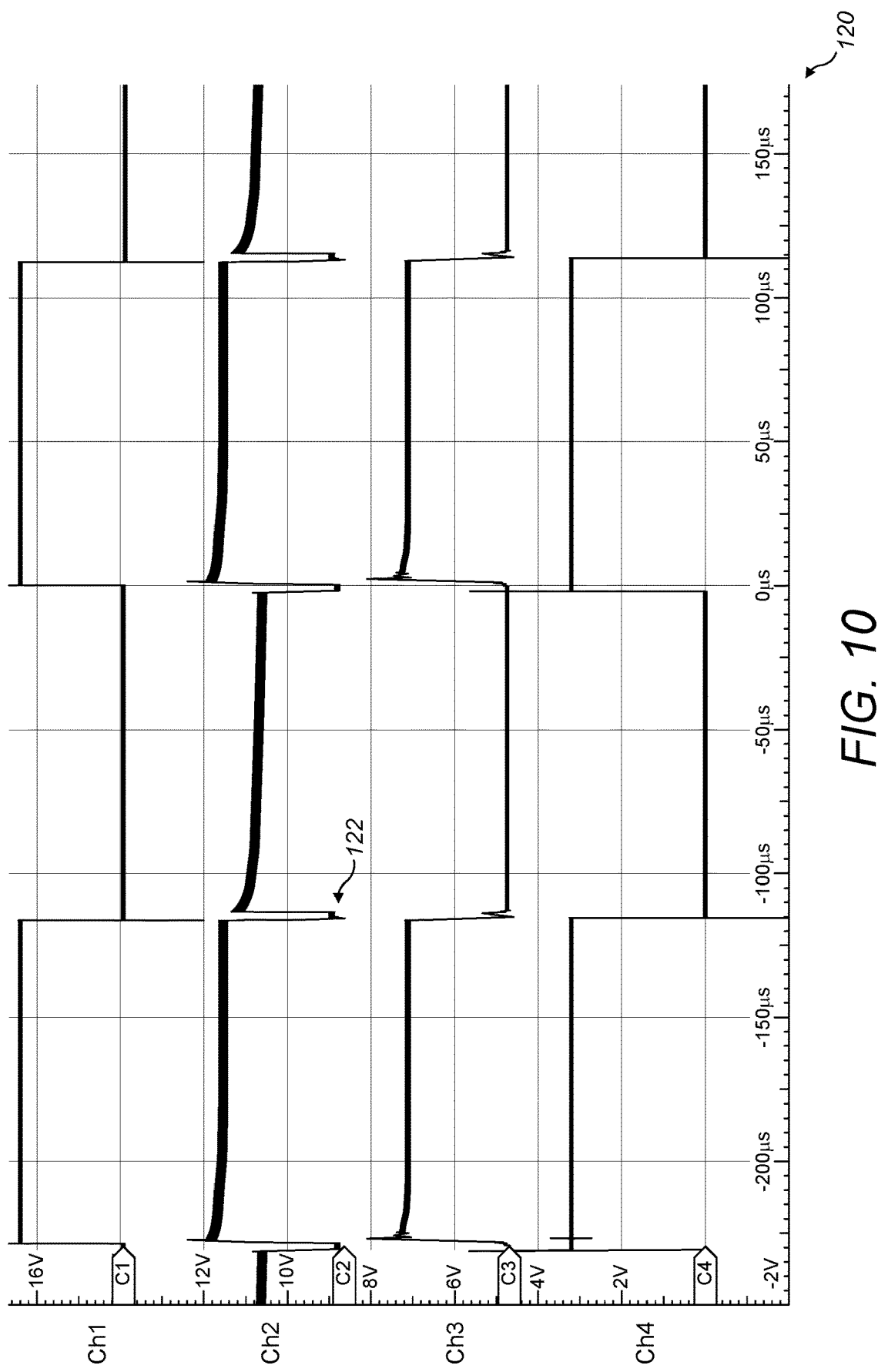
FIGS. 10 and 11 are plots in accordance with example embodiments.

FIG. 10 is a plot, indicated generally by the reference numeral 120, showing signals in accordance with an example embodiment. The plot shows example plots of channels described above.

The first channel (Ch1) is a square wave showing an example original TDD signal provided by the first modem 101. When the TDD signal is high, downlink transmissions are to be made; when the TDD signal is low, uplink transmissions are to be made.

The second channel (Ch2) depicts the envelope of the downlink signal. The envelope of the downlink signal shows downlink pulses aligned with the TDD signal being high, but also includes leakage uplink pulses aligned with the TDD signal being low. A small gap is visible (as indicated by the reference numeral 122) between the downlink and leakage uplink pulses, which gap is aligned with the edges of the TDD signal.

The third channel (Ch 3) depicts the recovered TDD signal (after cancellation of the leakage uplink signals), and shows downlink pulses aligned with the TDD signal being high.

Finally, the fourth channel (Ch 4) depicts the recovered TDD signal after duty cycle tuning.

Figure 11:
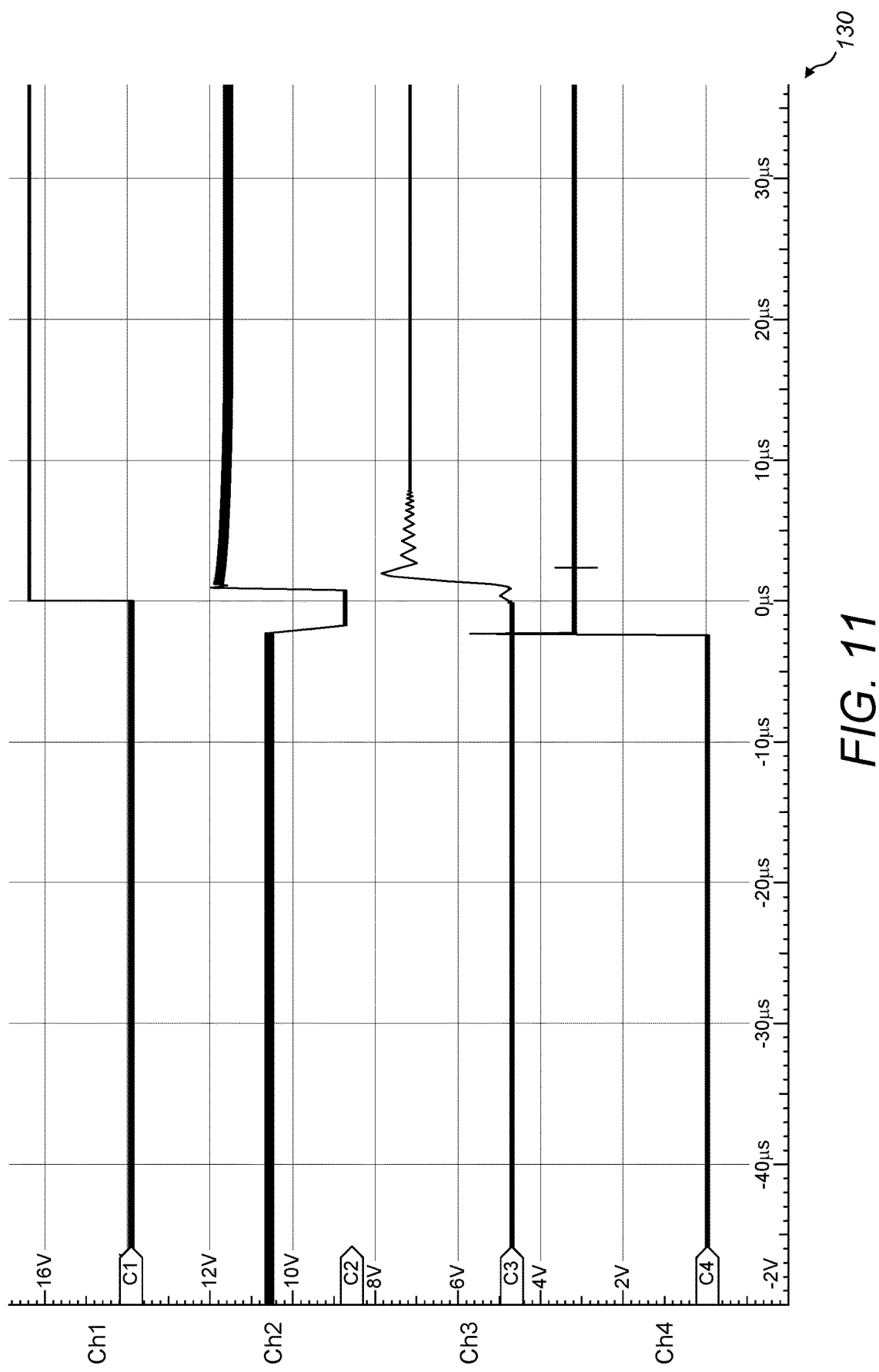

FIG. 11 is a plot, indicated generally by the reference numeral 130, showing signals in accordance with an example embodiment. (FIG. 11 is a "zoomed" version of FIG. 10.)

The plot 130 shows the first to fourth channels described above with reference to the plot 120. Of particular interest are the third and fourth channels (Ch3 and Ch4), where the change in position of the rising edge of the fourth channel (Ch4) as a result of duty cycle tuning can be seen.

The systems described above generally relate to mmW systems. This is not essential to all example embodiments. The principles described herein are widely applicable and may, for example, be applied to other frequency ranges, such as microwave frequencies. The principles described herein are applicable to wireless communication, but are also applicable to fixed access, integrated access, backhaul applications etc.

Figure 12:
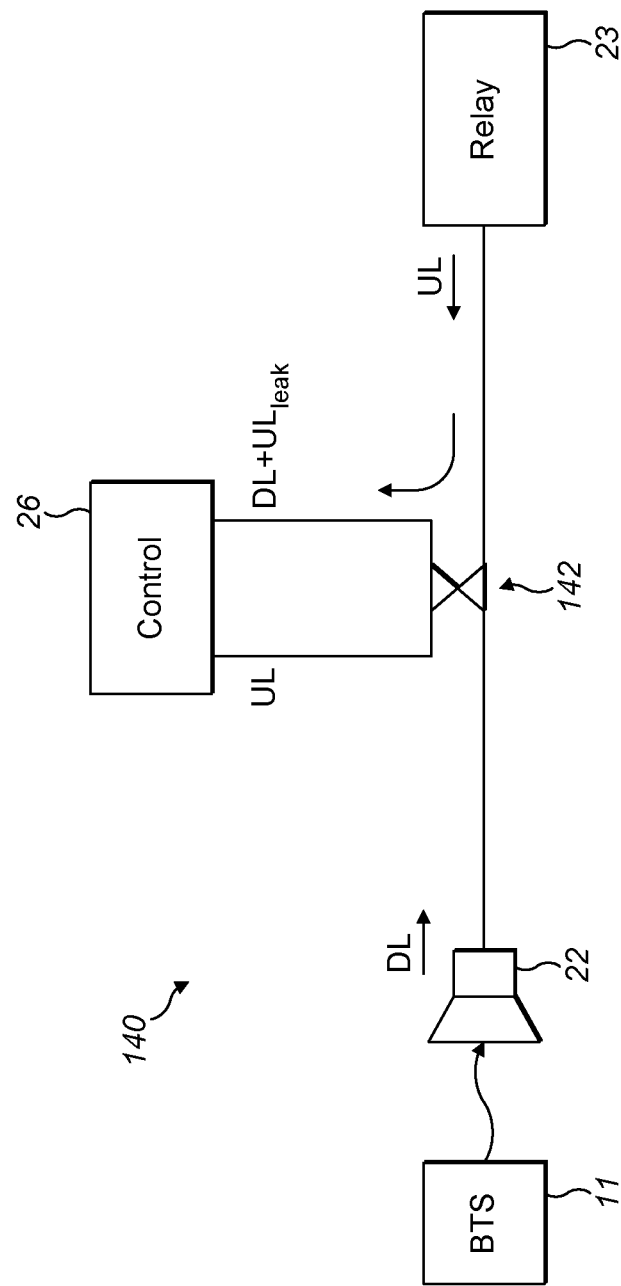
FIG. 12 is a block diagram of a system in accordance with an example embodiment.

A number of variants to the example embodiments described above are possible. For example, FIG. 12 is a block diagram of a system, indicated generally by the reference numeral 140, in accordance with an example embodiment. The system 140 comprises the communication node 11, the first antenna 22, the relay module 23 and the control circuit 26 of the system 40 described above. The system 140 differs from the system 40 in that a single coupler 142 is provided in place of the first coupler 41 and the second coupler 42 of the system 40. The coupler 142 couples both the downlink signals (as received at first antenna 22) and the amplified uplink signals (as output by the relay module 23) to the control circuit 26.

Figure 13:
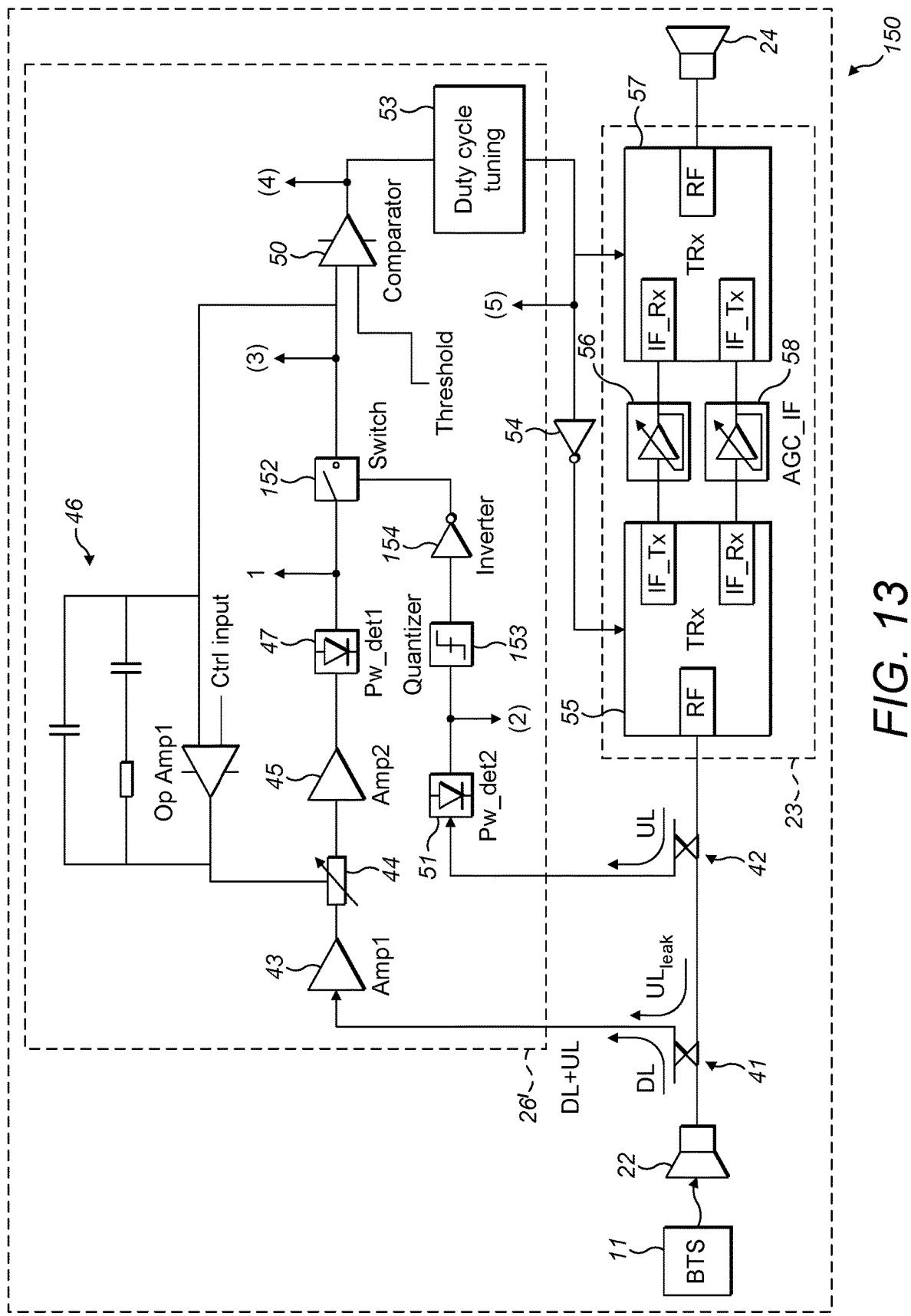
FIG. 13 is a block diagram of a system in accordance with an example embodiment.

FIG. 13 is a block diagram of a system, indicated generally by the reference numeral 150, in accordance with an example embodiment. The system 150 is a variant of the system 40 described above with reference to FIG. 4.

The system 150 comprises the communication node 11, the first antenna 22, the relay module 23 and the second antenna 24 of the systems 20 and 40 described above. The system, 150 further comprises a control circuit 26' that is a variant of the control circuit 26 of the systems 20 and 40 described above.

The system 150 comprises a first coupler 41 for coupling downlink signals as received at first antenna 22 to the control circuit 26' Similarly, the system 150 comprises a second coupler 42 for coupling amplified uplink signals (as output by the relay module 23) to the control circuit 26'. Of course, as noted above, a single coupler providing both coupling functions could be provided.

The control circuit 26' includes the first amplifier 43, the variable resistor 44, the second amplifier 45, the automatic gain control circuit 46 comprising the operational amplifier (Op Amp 1), the first power detector 47, the comparator 50, and the second power detector 51 of the control circuit 26 described above. The duty cycle tuning circuit 53 may be provided to correct a duty cycle of an output of the comparator 50.

The first and second level shifters 48 and 52 of the control circuit 26 are omitted and the functionality of the differential amplifier 49 replaced by a switch 152. The switch 152 is provided to prevent the unwanted uplink leakage signal from being provided to the comparator. The switch receives a clock signal from the output of the second power detector 51, which output is passed through a quantizer 153 and an inverter 154 before being provided to a clock input of the switch 152.

As described above, a TDD signal recovered by the control circuit 26' (and output by the comparator 50) is applied to the transceivers of the relay module 23 in both in-phase and inverted form. Therefore, the inverter circuit 54 is provided after the duty cycle tuning circuit 53.

The skilled person will be aware of a number of other variants of the systems 40 and 150.

Figure 14:
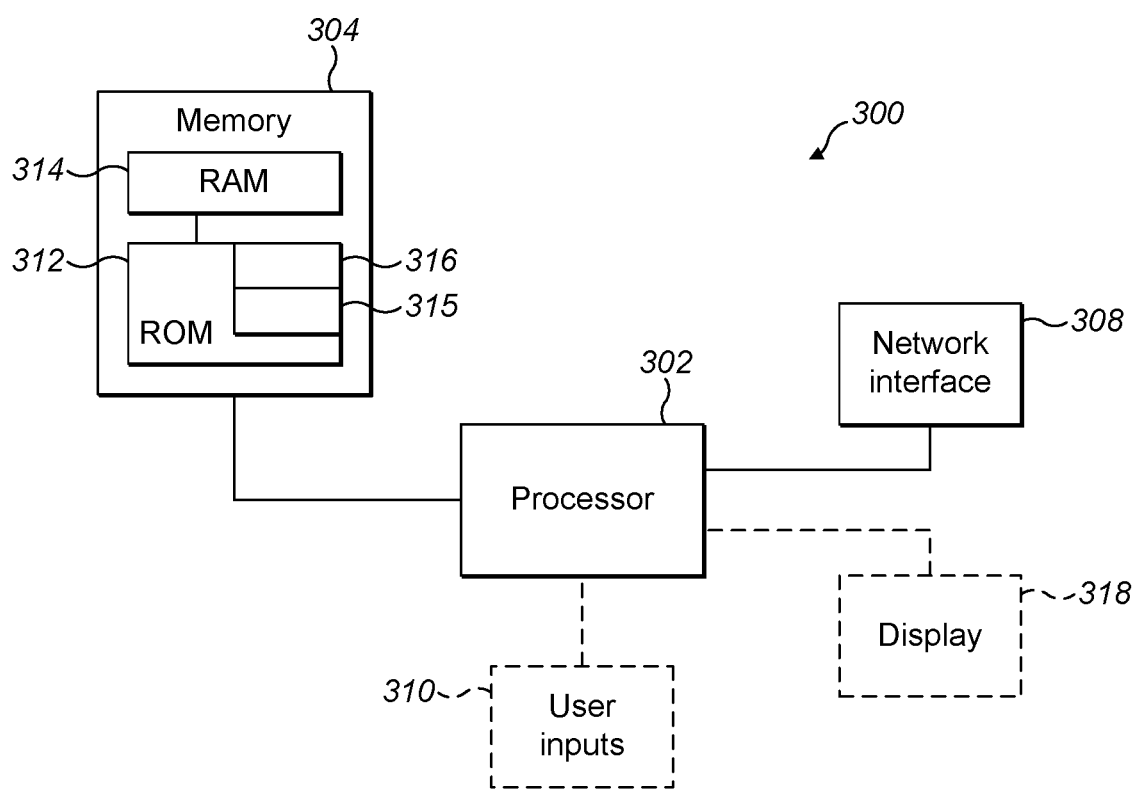
FIG. 14 is a block diagram of components of a system in accordance with an example embodiment.

For completeness, FIG. 14 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30 and 70 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 15A:
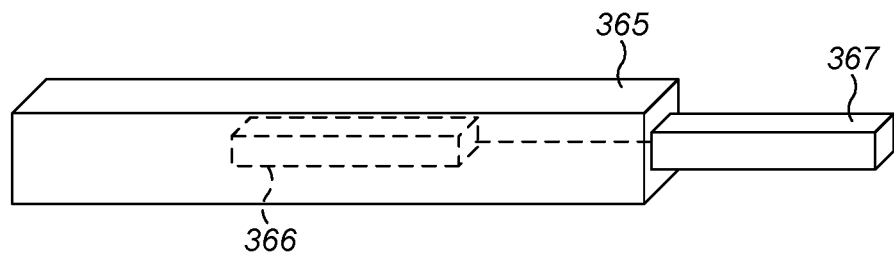
FIGS. 15A and 15B show tangible media, respectively a removable non-volatile memory unit and a Compact Disc (CD) storing computer-readable code which when run by a computer perform operations according to example embodiments.
Figure 15B:
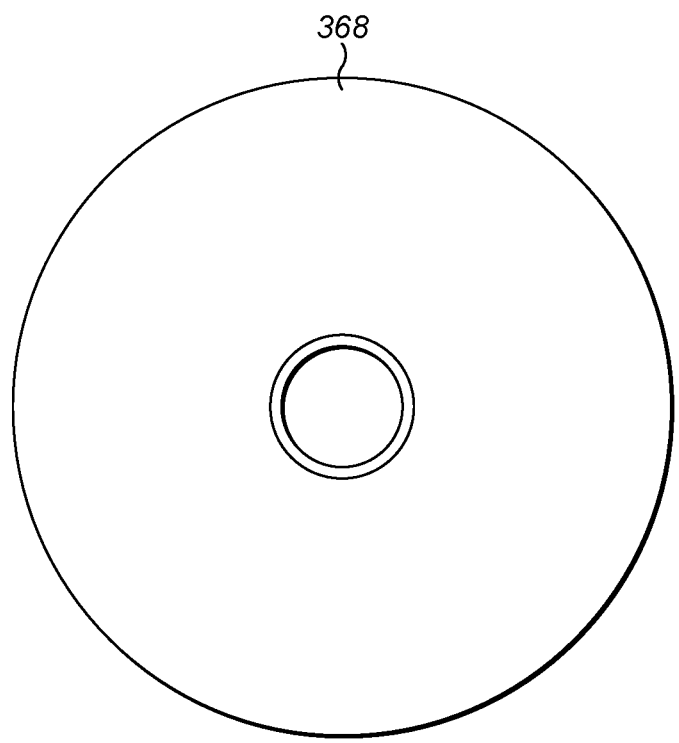

FIGS. 15A and 15B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 3 and 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor and at least one memory including computer program, the at least one memory and the computer program configured, with the at least one processor, to cause the apparatus to:
receive an amplified uplink signal from a relay circuit, wherein an uplink signal is amplified by the relay circuit;
receive a downlink signal;
process the downlink signal by cancelling leakage uplink signals within the received downlink signal to generate a processed downlink signal; and
generate a timing signal output based, at least in part, on the processed downlink signal.

2. An apparatus as claimed in claim 1, wherein the at least one memory and the computer program are further configured, with the at least one processor, to cause the apparatus to: provide the timing signal to the relay circuit.

3. An apparatus as claimed in claim 1, wherein the at least one memory and the computer program are further configured, with the at least one processor, to cause the apparatus to:
couple the downlink signal to the processing of said downlink signal; and
couple the amplified uplink signal to the processing of said downlink signal.

4. An apparatus as claimed in claim 3, wherein:
the coupling the downlink signal to the processing of said downlink signal comprises a first coupler; and
the coupling the amplified uplink signal to the processing of said downlink signal comprises a second coupler.

5. An apparatus as claimed in claim 1, wherein the downlink signal is received from a communication node of a mobile communication system.

6. An apparatus as claimed in claim 1, wherein the at least one memory and the computer program are further configured, with the at least one processor, to cause the apparatus to:
generate an envelope of said downlink signal, wherein said downlink signal includes leakage uplink signals; and
generate an envelope of said uplink signal.

7. An apparatus as claimed in claim 6, wherein the at least one memory and the computer program are further configured, with the at least one processor, to cause the apparatus to:
process the envelope of said downlink signal and the envelope of said uplink signal in order to cancel the leakage uplink signals within said received downlink signal.

8. An apparatus as claimed in claim 1, wherein the at least one memory and the computer program are further configured, with the at least one processor, to cause the apparatus to:
compare the downlink signal to a threshold value to generate said timing signal.

9. An apparatus as claimed in claim 1, wherein the at least one memory and the computer program are further configured, with the at least one processor, to cause the apparatus to:
tune a duty cycle of the timing signal to compensate for processing delays.

10. An apparatus as claimed in claim 9, wherein tuning said duty cycle comprises adjusting timing of rising and/or falling edges of a chain of timing signals.

11. An apparatus as claimed in claim 1 further comprising said relay circuit.

12. An apparatus as claimed in claim 1 wherein the relay circuit is configured to amplify signals at an intermediate frequency.

13. An apparatus as claimed in claim 1 further comprising:
a first antenna in two-way communication with a first node of a mobile communication system, wherein said first antenna is configured to receive said downlink signal and to send the amplified uplink signal; and a second antenna in two-way communication with a second node of the mobile communication system, wherein said second antenna is configured to receive said uplink signal and to send a amplified downlink signal.

14. A method comprising:

receiving an amplified uplink signal from a relay circuit, wherein an uplink signal is amplified by the relay circuit;

receiving a downlink signal;

processing the downlink signal by cancelling leakage uplink signals within the received downlink signal to generate a processed downlink signal; and generating a timing signal output based, at least in part, on the processed downlink signal.

15. A method as claimed in claim 14 further comprising:
providing the timing signal to the relay circuit.

16. A method as claimed in claim 14 further comprising:

coupling the downlink signal to the processing of said downlink signal; and coupling the amplified uplink signal to the processing of said downlink signal.

17. A method as claimed in claim 16 further comprising:

wherein coupling the downlink signal to the processing of said downlink signal comprises a first coupler; and wherein coupling the amplified uplink signal to the processing of said downlink signal comprises a second coupler.

18. A method as claimed in claim 14, wherein the downlink signal is received from a communication node of a mobile communication system.

19. A method as claimed in claim 14 further comprising:

generating an envelope of said downlink signal, wherein said downlink signal includes leakage uplink signals; and generating an envelope of said uplink signal.

20. A non-transitory computer-readable medium comprising program instructions stored thereon to cause an apparatus to perform at least the following:

receiving an amplified uplink signal from a relay circuit, wherein an uplink signal is amplified by the relay circuit;

receiving a downlink signal;

processing the downlink signal by cancelling leakage uplink signals within the received downlink signal to generate a processed downlink signal; and generating a timing signal output based, at least in part, on the processed downlink signal.

* * * * *